United States Patent [19]

Pollard

[11] Patent Number: 5,893,129
[45] Date of Patent: Apr. 6, 1999

[54] DOCUMENT STORAGE AND REPRODUCTION METHOD

[75] Inventor: Larry C. Pollard, Denver, Colo.

[73] Assignee: U S West, Inc., Denver, Colo.

[21] Appl. No.: 695,171

[22] Filed: Aug. 8, 1996

[51] Int. Cl.⁶ .................................................. G06T 1/00
[52] U.S. Cl. ......................... 707/522; 707/524; 395/110
[58] Field of Search ..................... 395/784, 786, 395/772, 761, 110; 707/522, 524, 511, 500

[56] References Cited

U.S. PATENT DOCUMENTS

| | | | |
|---|---|---|---|
| 5,369,742 | 11/1994 | Kurosu et al. | 395/147 |
| 5,432,899 | 7/1995 | Iwatani et al. | 395/145 |
| 5,528,742 | 6/1996 | Moore et al. | 395/145 |

*Primary Examiner*—Joseph H. Feild
*Assistant Examiner*—Motilewa Good-Johnson
*Attorney, Agent, or Firm*—Brooks & Kushman, P.C.

[57] ABSTRACT

The present invention relates to a method for reproducing a set of documents and the characters and fonts in each document, which includes, storing each document in a print file; creating an index file for each of the documents, containing a location of the document in the print file; creating a resource file containing directions on how to print the characters and fonts in the print file; requesting one or more documents for reprinting; combining the print file associated with each document for reprinting and the corresponding resource file to produce an output file; and reprinting one or more documents from the output file so that each character and font in each document can be reproduced.

8 Claims, 4 Drawing Sheets

DOCUMENT STORAGE AND REPRODUCTION METHOD

TECHNICAL FIELD

This invention relates to a method of reproducing a printed document so that the reproduction retains both the formatting and content of the original document.

BACKGROUND ART

To satisfy the changing needs and expectations of system users and keep pace with technological developments, sophisticated document system libraries are designed to be routinely restructured and remodified. Such modifications allow for, among other things, changes in document format and the generation of new characters and logos.

While prior art document system libraries have adapted well to change in system requirements, they have, nonetheless, caused difficulties for system users in situations where it is desired to access and reprint previously stored documents. Namely, a system which has been modified and remodified several times, is unable to reprint a previously generated document having printing formats, characters and logos which are now unfamiliar to it. Because of litigation, or otherwise, there is often a need to provide such duplicative documents with the same information as the original, and in the same format as the original printing. Moreover, companies are often requested to produce such documents years after their original printing. As an example, for companies that send out mass billings, a customer account inquiry or the need for billing records often calls for an exact duplicate of a previously submitted billing invoice. In some cases, the request for such a bill may come three or even five years after the printing of the original invoice.

Consequently, the need exists for a method of reprinting documents in the same format as the original printing from a file independent from the document system library.

SUMMARY OF THE INVENTION

It is a primary object of the present invention to provide an automated method for storing the formatting characteristics for each of a plurality of documents so that if a system library is updated, the document can be formatted based on its original printing.

It is another object of the present invention to provide a method for reproducing a document which stores information on how each font within the document is printed to obtain an exact reproduction of the original.

In carrying out the above objects, the present invention discloses a method for reproducing a plurality of documents and a plurality of characters and fonts in each document. The method includes the step of storing each document in a print file. The next step involves creating an index file for each of the documents, the index file containing a location of the document in the print file and the document's name. A resource file is then created, containing directions on how to print the characters and fonts in the print file. When a reprint is requested of one or more documents, the next step is combining the print file associated with each of the documents for reprinting and the corresponding resource file to produce an output file for reprinting. Lastly, the documents requested are reprinted from the output file so that each character and font in each document can be reproduced.

In an alternative embodiment, there is disclosed a process for enabling reproduction of a plurality of documents and a plurality of coded fonts, overlays and rasters within the documents, from a system library, with a computer having a memory and a processor. The process includes a) storing each of the plurality of documents in a print file; b) creating an index file for each document, the index file containing the document's location in the print file and the document's name; c) creating a resource file for the print file which stores directions on how to print each document's coded fonts, overlays and rasters, the step of creating a resource file further comprising: i) providing an object name for each of the document's coded fonts, overlays and rasters; ii) creating a first object list file containing the object names; iii) extracting a member name from the system library corresponding to each object name; iv) allocating each member name to each object name; and v) writing the contents of the system library associated with the member name in the resource file in the form of a plurality of resource objects; and d) combining the resource file and the print file for each document into an output file so that each document can be reproduced.

The step of writing the contents of the system library associated with the member name in the resource file in the form of a plurality of resource objects further includes the steps of: a) writing resource objects for a character set and a code page in response to the resource object being a coded font; b) writing resource objects for a plurality of character sets, page definitions and code pages which may be contained in the overlay in response to the resource object being an overlay; c) obtaining a member name for each resource object and writing the member names for the coded font and overlay research objects in a second object list file in response to the resource object being a coded font or an overlay; and d) adding the resource objects from the second object list file to the resource file.

In another embodiment of the invention there is provided a method for reproducing a plurality of documents and a plurality of coded fonts, overlays and rasters within the documents, from a system library, with a computer having a memory and a processor, which includes: a) storing each of the plurality of documents in a print file; b) creating an index file for each document that contains the document's location in the print file and the document's name; c) creating a resource file for the print file which stores directions on how to print each document's coded fonts, overlays and rasters; d) requesting reproduction of one or more documents; e) retrieving from the memory, each resource file and each print file corresponding to the requested documents until all of the requested documents are accounted; f) writing the resource file and print file corresponding to the requested documents to an output file in response to the documents requested being found within one print file; g) writing each of the resource files and print files corresponding to the requested documents to an output file in response to the documents requested not being found within one print file; and h) printing the requested documents from the output file.

The objects, features, and advantages of the present invention are readily apparent from the following detailed description of the best mode for carrying out the invention when taken in connection with the accompanying drawings.

While the invention will be described in connection with several embodiments, it will be understood that this description is not intended to limit the invention to these embodiments. On the contrary, the invention is intended to cover all alternatives, modifications and equivalents as may be included within the spirit and scope of the invention as defined by the attached claims.

BEST MODE FOR CARRYING OUT THE INVENTION

The present invention provides a method for initiating reprints of documents that require duplication. For example, telecommunications companies, which engage in large-scale mailings, often need to reprint damaged, lost, or low-quality invoices. With formatting sequences constantly being updated in a document system library, a previously produced document which has subsequently been reformatted may not be available for duplication. If a document system library alters its sequencing and formatting structure, previously produced document characters and fonts will not be printed the same as the original. For many reasons, a duplicate document is needed and thus this invention provides a process for reproducing each character and font in a document.

The reprint process involves four separate sub-processes: 1) a load process; 2) resource file creation; 3) reprint request facility; and 4) a reprint retrieve application. A fifth system, a statistical reprinting system, is optional and if desired can keep records of the reprint process.

Figure 1:
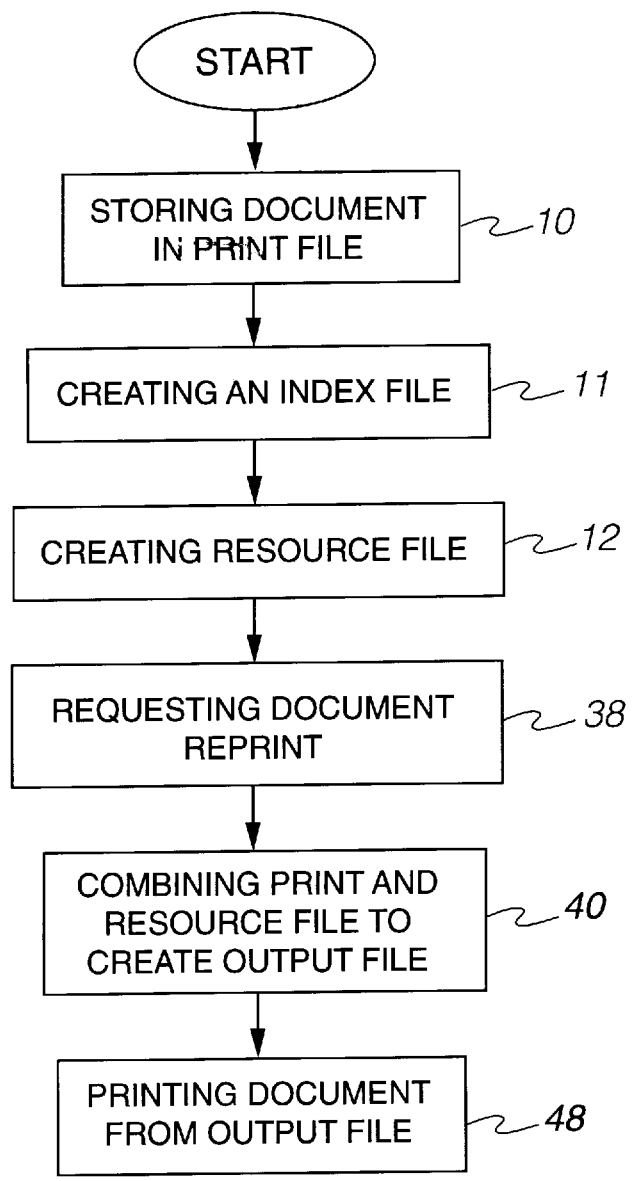
FIG. 1 is a flow diagram of a method for reproducing each character and font in a document in accordance with the present invention.

Turning now to FIG. 1, a flow diagram illustrates a method for reproducing a plurality of documents and a plurality of characters and fonts in each document for use with a computer having a processor and memory. The first step involves storing, 10, each of the documents in a print file. This step is ordinarily achieved at the time of the original printing of the document, when the document is first formatted for printing in a print file.

An index file is then created, 11, containing the location of the document in its associated print file. In the preferred embodiment, the index file would be created at the time when the document is first printed. The index file contains the information that identifies the location of the document from the print file associated with the original printing and the physical name of the document file. This information is in a format to facilitate subsequent loading onto a database. A standard load utility can be used to load and replace the information. Accordingly, the document is located and accessible for loading when required.

A resource file is next created, 12, for storing directions on how to print the characters and fonts in the document. In the preferred embodiment, a resource file will contain all the information required to re-run documents without having to reference the system library, including fonts, overlays, sequencing, formatting, and characters. The resource file can be used for reprinting a set of documents or a specific document.

Figure 2:
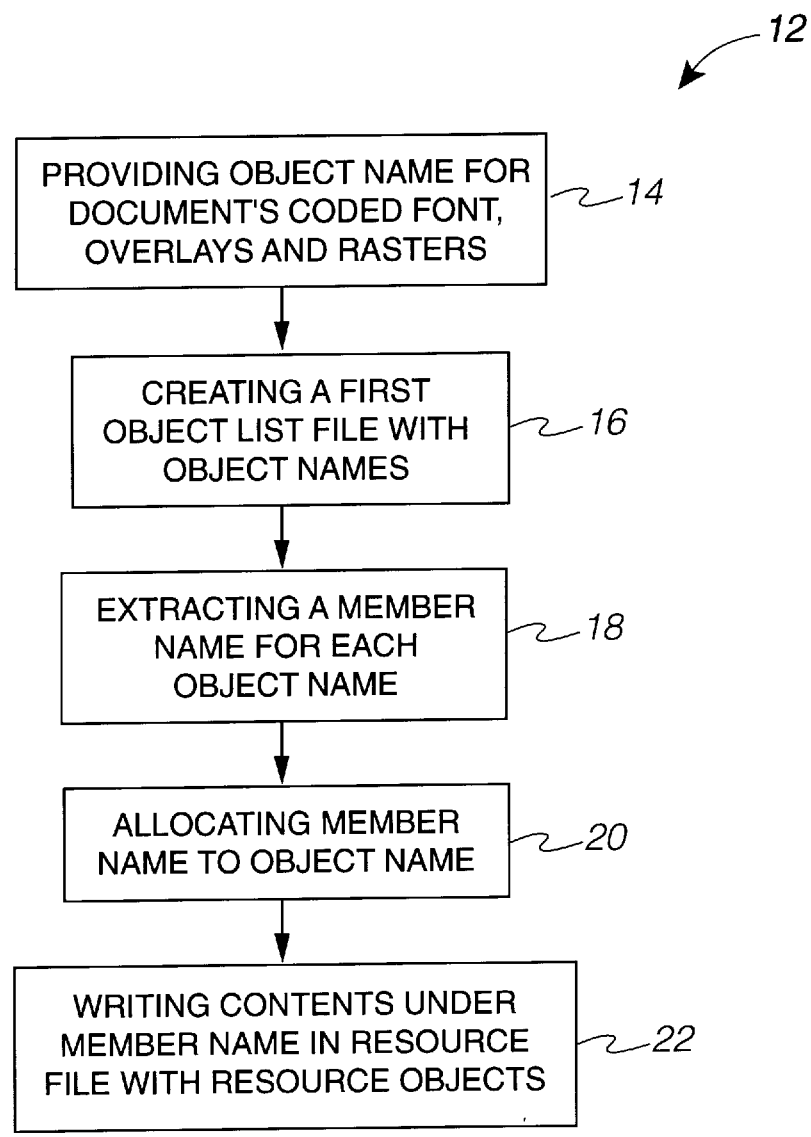
FIG. 2 is a flow diagram of a method for creating a resource file in accordance with the present invention.

Referring to FIG. 2, the process involved in the creation, 12, of a resource file is depicted. As set forth in the next step, the process first provides 14 from database tables an object name for each coded font, raster and overlay in the document. The coded font, raster and overlay information provides the formatted information needed to print the characters, dot formation (raster) patterns and overlays of the document.

The next step, involves creating, 16, an object list file having the object names therein. The object list file is preferably sorted by object name and duplicates are removed from the list. As shown in FIG. 2, a member name is then extracted, 18, from the system library, a member name which corresponds with the object names in the file. Each object name is then allocated, 20, with its corresponding member name.

The following step involves writing, 22, the contents of the system library associated with each member name, in the resource file in the form of a set of resource objects. Once the contents of the system library under each member name, have been transferred in the form of resource objects, the relevant information for printing and formatting each document has been retrieved and transferred into a readily accessible and remote location for future use.

Figure 3:
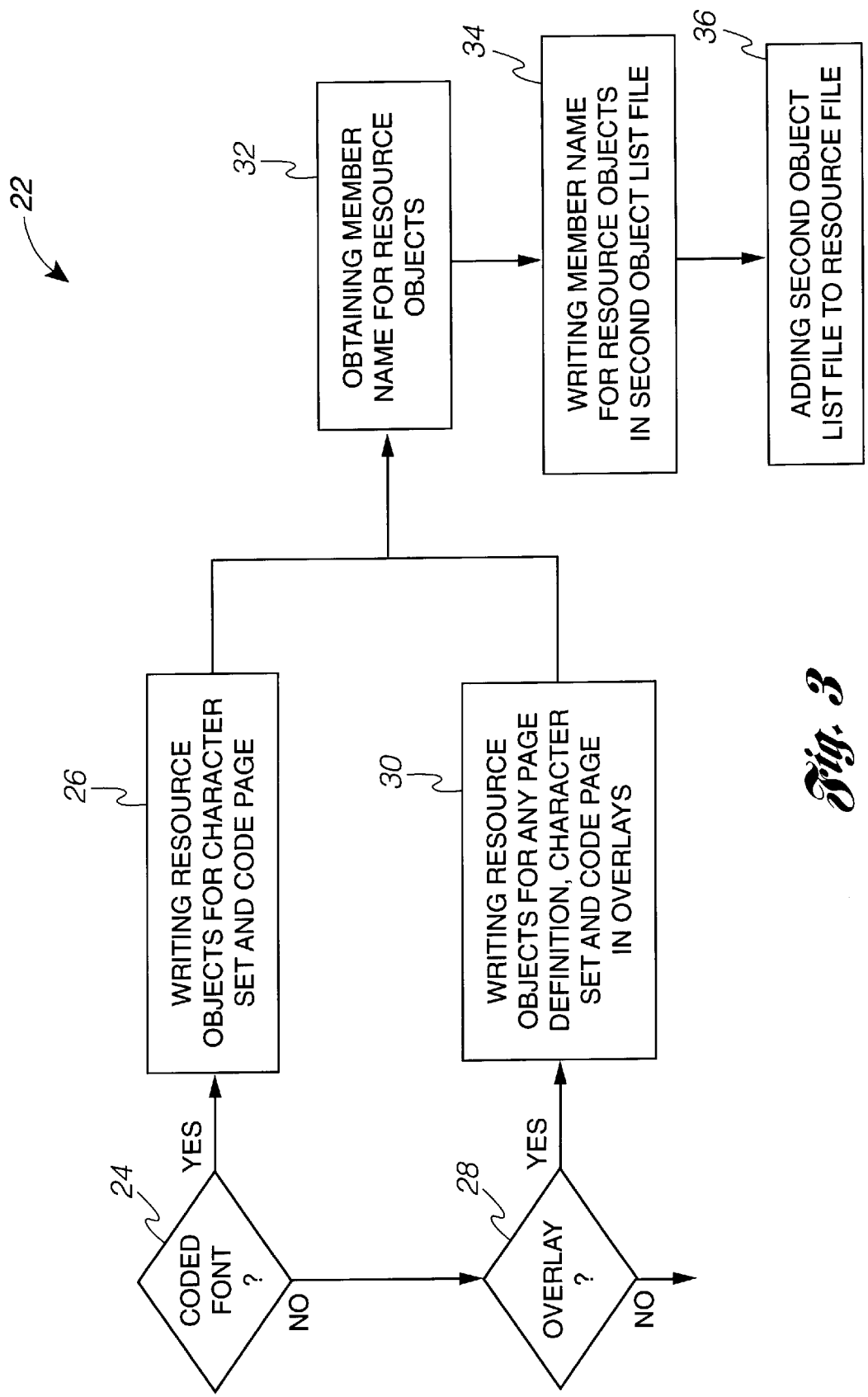
FIG. 3 is a flow diagram of a method for writing the contents of a system library in the form of resource objects.

Referring now to FIG. 3, the step of writing 22 the contents of the system library associated with the member name in the resource file in the form of a set of resource objects is further provided. If the resource object being written, 24, is a coded font or an overlay, there are additional resources to write. For each coded font, there is a character set and code page. Accordingly, if the resource object being written from the system library is a coded font, resource objects have to be written, 26, for a character set and a code page. If the resource object being written, 28, from the system library is a page overlay, it may contain character sets, page definitions and code pages. Then, additional resource objects may have to be written, 30, for any character sets, page definitions and code pages contained in an overlay resource object.

For any additional resource objects written, 26, 30, for a coded font or an overlay, there is further required the step of obtaining, 32, member names, for each of these additional resource objects. Member names for these additional resource objects are contained within the coded font or page overlay resource object.

Any additional resource objects written, 26, 30, for a coded font or an overlay are then written, 34, to a second object list file. Subsequently, the resource objects contained in the second object list file are added, 36, to the resource file. The steps as shown in FIG. 3, for writing the contents of the system library into resource objects is then completed.

Referring back to FIG. 1, having created a resource file containing resource objects, the next step involves requesting, 38, one or documents for reprinting. Following the reprint request is the step of combining the print file, 40, and the resource file into an output file. In the preferred embodiment, the print file and the resource will be combined into an output file when a user designates the reprint of an entire print file, a range of documents in a print file or a specific document.

Figure 4:
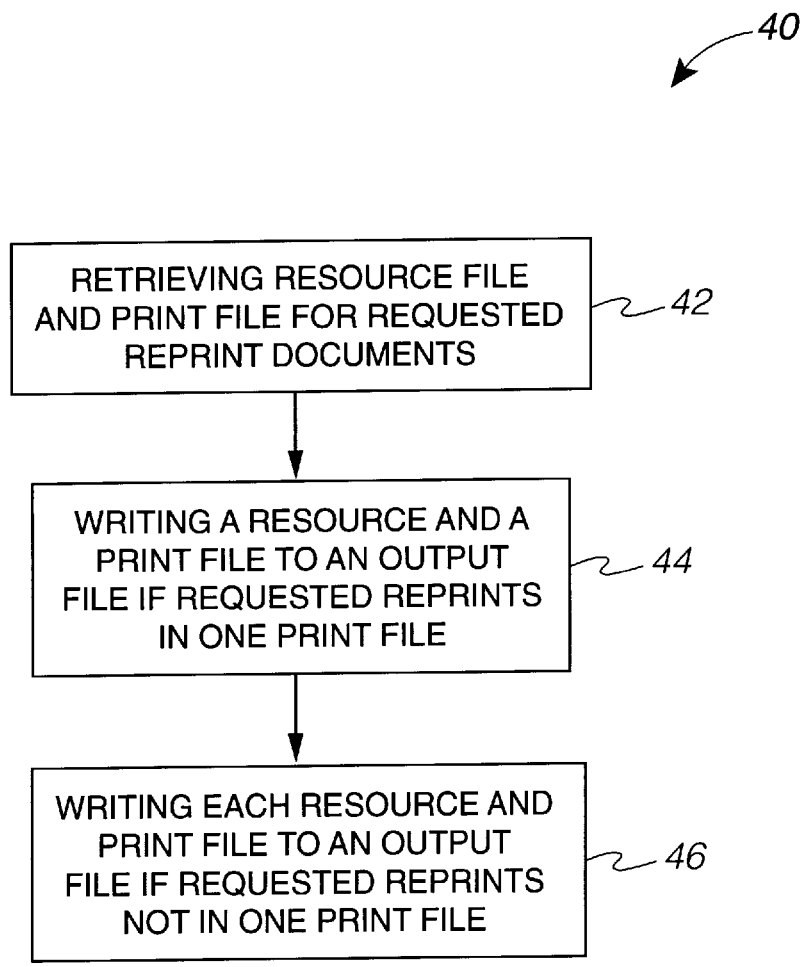
FIG. 4 is a flow diagram of the steps associated with combining printing information from the resource file and print file to enable reproduction of a set of documents.

As shown in FIG. 4, depending on whether a document or a set of documents are requested for reprinting from a print file, or different print files, information will be retrieved to achieve the requested reprinting. The retrieval process as shown in FIG. 4, first requires, retrieving, 42, from the memory, each resource file and each print file corresponding to the requested documents until all of the requested documents are accounted.

The following step involves writing, 44, the resource file and print file corresponding to the requested documents to an output file in response to the documents requested being found within one print file. Thus, if all of the requested documents are from one print file then only one resource file and print file will be combined into the output file for that reprint request.

If the documents requested are found in more than one print file, then the next step is writing 46 each of the resource files and print files corresponding to the requested documents to an output file. Where the documents requested are found in more than one print file, multiple executions of the step will be required to combine each relevant resource file and each relevant print file to create the proper output file.

The last step provides that once all of the relevant print files and resource files are combined, 40, the documents selected are reprinted, 48, from the output file, as depicted in FIG. 1.

In this way, when the selected documents are reprinted each character and font from the original print are reproduced. Moreover, as the index and resource files are created when the original print is made, a separate set of files is created for each document which can be subsequently retrieved for reprinting without having to again access print formatting information from the system library. As the system library includes constantly updating font formats, there is a significant benefit to storing a separate set of files having each document's print format information available for reprinting.

Lastly, if a particular reprint requires, statistical reports can be formulated for the reprints. Within the statistical report, it is preferred that the following information is reported: the job name of the reprint job cycle, date, file name, and the requested total number of documents.

While the best modes for carrying out the invention has been described in detail, those familiar with the art to which this invention relates will recognize various alternative designs and embodiments for practicing the invention as defined by the following claims.

What is claimed is:

1. For use with a computer having a processor and memory, a method for reproducing a plurality of documents and a plurality of characters and fonts in each document, comprising:

storing each document in a print file;

creating an index file for each of the documents, the index file containing a location of the document in the print file and the document's name;

creating a resource file containing directions on how to format each document and print the characters and fonts in the print file;

requesting one or more documents for reprinting;

combining the print file associated with each of the documents for reprinting and the corresponding resource file to produce an output file for reprinting; and reprinting one or more documents from the output file so that each character and font in each document can be reproduced.

2. The method of claim 1, further comprising the step of creating a statistical report which lists the documents for reprinting.

3. A method for enabling reproduction of a plurality of documents and a plurality of coded fonts, overlays and rasters within the documents, from a system library, with a computer having a memory and a processor, the process comprising:

storing each of the plurality of documents in a print file;

creating an index file for each document, the index file containing the document's location in the print file and the document's name;

creating a resource file for the print file which stores directions on how to format each document and print each document's coded fonts, overlays and rasters, the step of creating a resource file further comprising:

providing an object name for each of the document's coded fonts, overlays and rasters;

creating a first object list file containing the object names;

extracting a member name from the system library corresponding to each object name;

allocating each member name to each object name;

writing the contents of the system library associated with the member name in the resource file in the form of a plurality of resource objects; and combining the resource file and the print file for each document into an output file so that each document can be reproduced.

4. The method of claim 1, wherein the step of writing the contents of the system library associated with the member name in the resource file in the form of a plurality of resource objects further comprises the steps of:

writing resource objects for a character set and a code page in response to the resource object being a coded font;

writing resource objects for a plurality of character sets, page definitions and code pages which may be contained in the overlay in response to the resource object being an overlay;

obtaining a member name for each resource object and writing the member names for the coded font and overlay research objects in a second object list file in response to the resource object being a coded font or an overlay; and adding the resource objects from the second object list file to the resource file.

5. A method for enabling reproduction of a plurality of documents and a plurality of coded fonts, overlays and rasters within the documents, from a system library, with a computer having a memory and a processor, the process comprising:

storing each of the plurality of documents in a print file;

creating an index file for each document that contains the document's location in the print file and the document's name;

creating a resource file for the print file which stores directions on how to format each document and print each document's coded fonts, overlays and rasters, the step of creating a resource file further comprising:

providing an object name for each of the document's coded fonts, overlays and rasters;

creating a first object list file containing the object names;

extracting a member name from the system library corresponding to each object name;

allocating each member name to each object name;

writing the contents of the system library associated with the member name in the resource file in the form of a plurality of resource objects, further comprising:

obtaining a member name for each resource object and writing the member names for the coded font and overlay research objects in a second object list file in response to the resource object being a coded font or an overlay; and adding the resource objects from the second object list file to the resource file; and combining the resource file and the print file for each document into an output file so that each document can be reproduced from the output file.

6. The method of claim 5, wherein the step of writing the contents of the system library associated with the member name in the resource file in the form of a plurality of resource objects further comprises the steps of:

writing resource objects for a character set and a code page in response to the resource object being a coded font;

writing resource objects for a plurality of character sets, page definitions and code pages which may be contained in the overlay in response to the resource object being an overlay;

obtaining a member name for each resource object and writing the member names for the coded font and overlay research objects in a second object list file in response to the resource object being a coded font or an overlay; and adding the resource objects from the second object list file to the resource file.

7. A method for reproducing a plurality of documents and a plurality of coded fonts, overlays and rasters within the documents, from a system library, with a computer having a memory and a processor, comprising:

storing each of the plurality of documents in a print file;

creating an index file for each document that contains the document's location in the print file and the document's name;

creating a resource file for the print file which stores directions on how to format each document and print each document's coded fonts, overlays and rasters;

requesting reproduction of one or more documents;

retrieving from the memory, each resource file and each print file corresponding to the requested documents until all of the requested documents are accounted;

writing the resource file and print file corresponding to the requested documents to an output file in response to the documents requested being found within one print file;

writing each of the resource files and print files corresponding to the requested documents to an output file in response to the documents requested not being found within one print file; and printing the requested documents from the output file.

8. The method of claim 7, wherein the step of writing the contents of the system library associated with the member name in the resource file in the form of a plurality of resource objects further comprises the steps of:

writing resource objects for a character set and a code page in response to the resource object being a coded font;

writing resource objects for a plurality of character sets, page definitions and code pages which may be contained in the overlay in response to the resource object being an overlay;

obtaining a member name for each resource object and writing the member names for the coded font and overlay research objects in a second object list file in response to the resource object being a coded font or an overlay; and adding the resource objects from the second object list file to the resource file.

\* \* \* \* \*